United States Patent [19]
Nakajima et al.

[11] 3,812,497
[45] May 21, 1974

[54] CAMERA WITH AUTOMATIC EXPOSURE CONTROLS

[75] Inventors: Tohru Nakajima; Masatoshi Marui, both of Tokyo, Japan

[73] Assignee: Asaki Kogaku Kogyo Kabushiki Kaisha, Tokyo-to, Japan

[22] Filed: Apr. 21, 1971

[21] Appl. No.: 136,105

[30] Foreign Application Priority Data
May 23, 1970  Japan.............................. 45-50755

[52] U.S. Cl. .................. 354/28, 95/42, 95/53 EB, 95/64 B
[51] Int. Cl. ....... G03b 7/08, G03b 9/07, G03b 9/62
[58] Field of Search ..... 95/10 C, 10 CT, 42, 53 EB, 95/64 B

[56] References Cited
UNITED STATES PATENTS

| | | | |
|---|---|---|---|
| 3,533,348 | 10/1970 | Yanagi.......................... | 95/10 CT X |
| 3,324,779 | 6/1967 | Nobusawa et al............ | 95/10 CT X |
| 3,442,190 | 5/1969 | Erickson....................... | 95/10 CT |
| 3,581,633 | 6/1971 | Uno............................... | 95/10 CT |
| 3,303,766 | 2/1967 | Karikawa et al.............. | 95/10 CT |

FOREIGN PATENTS OR APPLICATIONS
44-18672   8/1969   Japan.............................. 95/10 CT Primary Examiner—Joseph F. Peters, Jr.
Attorney, Agent, or Firm—Steinberg & Blake

[57] ABSTRACT

A single lens reflex camera in which exposure time is automatically determined. The camera has an objective to which a diaphragm is connected to be stopped down for determining the exposure aperture when an exposure is to be made. A reflector has a rest position extending across the optical axis and is moved to an exposure position away from the optical axis when an exposure is to be made. A photosensitive element such as a photocell receives light from the reflector while the latter is in its rest position. An electrical circuit to which the photosensitive element is connected is operatively connected with a shutter of the camera to determine the exposure time. In response to operation of the camera shutter, the electrical circuit is rendered operative and the diaphragm is stopped down to a preselected value so that light will be reflected by the reflector to the photosensitive element for introducing into the circuit the factors of the brightness at the object which is to be photographed and the setting of the diaphragm. With these factors thus introduced into the circuit the reflector is displaced to its exposure position so that the film is exposed and at the same time the electrical circuit determines the exposure time.

5 Claims, 1 Drawing Figure

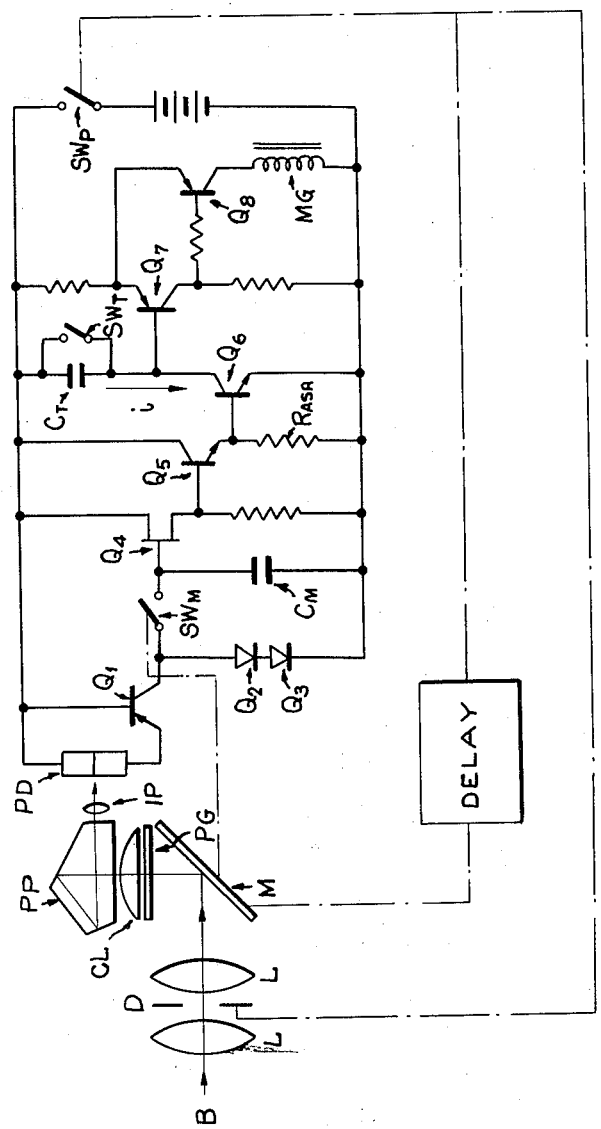

CAMERA WITH AUTOMATIC EXPOSURE CONTROLS

BACKGROUND OF THE INVENTION

The present invention relates to cameras.

More particularly, the present invention relates to single lens reflex cameras wherein exposure time is automatically determined with light which has passed through the objective so that the camera has a so-called TTL (through-the-lens) photometric system.

With progress in the electronic arts many devices of various different types have become known for the purpose of achieving automatic exposure time with cameras of this type. These known automatic exposure time controlling mechanisms utilize different types of photometry which may be classified according to one type where light measurement takes place with the objective, or more precisely the diaphragm, stopped down and another type where the objective or diaphragm are fully open while the light is measured. Conventionally focussing of the camera has taken place simultaneously with the photometric or light-measuring operations, so that the focussing operations are accompanied by inconvenience with respect to a range of higher stop values. In order to avoid this drawback systems have been developed according to which the light measuring or photometry operations take place with the diaphragm fully opened so that both focussing and light measurement take place with no obstruction to light passing through the objective.

In order to achieve this latter type of operation the diaphragm operating ring is coupled with the electrical light-measuring or photometric circuit, so that while this diaphragm ring is turned to a given diaphragm setting the diaphragm nevertheless remains open but at the same time through this ring a variable resistor is adjusted so as to introduce into the control circuitry a stop value in the form of a quantity of electricity which is controlled by turning off the diaphragm operating ring, with this quantity of electricity being transmitted into the photometric circuit. This type of open-diaphragm photometry has been utilized in almost all cameras which have automatic exposure time controls.

Structures of this type require the circuit to include variable resistances which are adjusted according to factors such as the size of the exposure aperture. In this way signals corresponding to the diaphragm setting for example, are introduced. In addition to a variable resistor to introduce the factor of the diaphragm setting there is also conventionally a variable resistor to introduce the factor of the film speed, and a suitable electrical signal is provided according to differential operations of these two variable resistances. The variable resistance which introduces the factor of the diaphragm setting is coupled to the diaphragm operating ring and is situated within the camera body so that it does not form part of the lens or objective assembly of a single lens reflex camera. Such cameras conventionally have interchangeable lenses, so that a slider of the variable resistor for introducing the factor of the size of the exposure aperture is generally moved as by being turned by a gearing pin coupled with the diaphragm operating ring of each of the interchangeable camera lenses. In this way a given stop value is converted into a suitable electrical signal. As is well known each of the interchangeable lenses has a given T number and for proper TTL exposure control compensation should be made for an error in the extent of exposure when the diaphragm is in the region of its fully open position, since at this time there is an increase in the difference between the F number and the T number. These exposure errors which occur under these conditions are caused because of lack of uniformity in manufacture and quality of variable resistors and because of lack of uniformity in the open area defined by the diaphragm sectors in accordance with the position of the diaphragm operating ring. Considerable efforts are required in designing and manufacturing to reduce this error, but it is impossible nevertheless, to eliminate this error fully so that this error remains without compensation in conventional structures. Thus, particularly with cameras which are used frequently it is extremely difficult to maintain a high degree of precision in the amount of exposure since changes such as wear and tear increase the uncontrollable exposure time variations. The starting and stopping movement of the slider of the variable resistor often cannot be determined accurately, depending upon the particular type of lens mount.

SUMMARY OF THE INVENTION

It is accordingly a primary object of the present invention to provide a camera of the above general type which will avoid the above drawbacks.

In particular, it is an object of the present invention to provide an improved system of automatic exposure time control using a photometry or light-measuring system with the diaphragm already in its stopped down condition.

Thus, the objects of the present invention include determining the exposure in a manner which is fully accurate under the above conditions and corresponds to the actual T number of the particular lens which is mounted on the camera at any given time.

Also, it is an object of the present invention to provide for a camera of the above type electrical circuitry which is simpler and less expensive than conventional electrical circuitry, requiring a smaller number of variable resistors than has heretofore been required.

Also, the objects of the present invention include the provision of an electrical circuit having components which respond with exceedingly high rapidity to impingement of light on a photosensitive element so that the factor of the light intensity, as modified by the size of the aperture, can be introduced into the circuit in an extremely short time.

According to the invention a single-lens reflex camera has an objective means for directing to film in the camera an image of the object which is to be photographed. A diaphragm means coacts with the objective means for determining the exposure aperture. A reflector means has a rest position extending across the optical axis to prevent light from reaching the film, and this reflector means is movable from its rest position to an exposure position displaced beyond the optical axis so that an exposure can take place. A photosensitive means receives light from the reflector means when the latter is in its rest position and an electrical circuit means is operatively connected with a shutter of the camera to determine automatically the exposure time, this electrical circuit means being operatively connected with the photosensitive means so that through the latter the factor of the light intensity at the object is introduced with light relfected by the reflector means. An operating means is provided to render the electrical circuit means operative as well as to stop the diaphragm means down to a selected aperture size when the shutter is actuated to make an exposure. Initially the relfector means remains in its rest position so that light from the object is directed by the objective means and the reflector means to the photosensitive means with this light being modified according to the diaphragm setting, so that in this way before the reflector means is displaced to its exposure position the photosensitive means introduces into the electrical circuit means the factor of light intensity and aperture size. Then the operating means displaces the reflector means to its exposure position so that the exposure is made and simultaneously the electrical circuit means controls the shutter to provide the proper exposure time.

BRIEF DESCRIPTION OF DRAWINGS

The invention is illustrated by way of example in the accompanying drawing which forms part of this application and in which a camera according to the invention is schematically represented together with details of the electrical circuitry.

DESCRIPTION OF PREFERRED EMBODIMENTS

The intensity of illumination E on the surface of a photosensitive means which is exposed to light from the object is given by the following relation:

$$E = K (B/A^2) \tag{1}$$

where $B$, $A$ and $K$ are respectively the brightness or light intensity of the objects or scene to be photographed, a stop value and a constant. This relation (1) may be related to the exposure time T by utilizing the film speed S according to the following:

$$T = K \cdot (A^2/B) \cdot (1/S) \tag{2}$$

where $K$ is a constant. Thus, the exposure time in photometry with the objective stopped down depends upon the light intensity at the surface of the photosensitive means which is exposed to the light and the film speed, while exposure time utilizing photometry with a fully open objective is a function of the light intensity or brightness of the scene which is to be photographed, the stop value, and the film speed.

According to the present invention photometry or light measurement is carried out with the diaphragm already in a stopped down condition. The electrical output of the photosensitive means according to the circuit disclosed in the accompanying drawing is subjected to a log compression, temporary storage and photographic operation, and thereafter a capacitor is charged with current obtained from a log expansion part of the circuit means so as to provide a predetermined voltage. The time required to obtain this predetermined voltage corresponds to the required exposure time. This type of system may be referred to as a linear operation system. For controlling a shutter electrically with this type of circuitry, the logarithmic indication or APEX indication is given by the above relationship (2) and is easier to understand as the photographic basic relation. Thus, the additional symbol V may be affixed to each item of the equation as follows:

$$T_v = B_V + (S_V - A_v) \tag{3}$$

Symbols such as $T_v$ in this equation (3) may be referred to as APEX exponents.

Variable resistances inserted into an electrical circuit usually provide the electrical signal corresponding to $(S_V - A_V)$, which is the second term on the right side of equation 3. $S_V$ is determined by a variable resistor coupled to a so-called A S A ring which may be set in accordance with the film speed. The value $A_V$ is conventionally introduced by another variable resistor coupled to the diaphragm operating ring, and then the electrical signal corresponding to the term $(S_V - A_V)$ is determined in accordance with differential operations of these variable resistors. Because the variable resistor which is coupled to the diaphragm operating ring is situated within the camera instead of at the lens itself, particularly with single-lens reflex cameras which have interchangeable lenses, the above inconveniences are necessarily inherent in such conventional structure. Thus, as was pointed out above the conversion of a given stop value into a given electrical signal with known structures has necessarily been accomplished on the basis of a given stop value (F number) even in a system which does not utilize linear operation, and it is desirable to achieve such a conversion on the basis of the so-called T number which is characteristic of a given lens, particularly with T T L exposure controls, so as to attempt to compensate for the exposure error which necessarily results because of the difference between the F number and T number inasmuch as this latter difference increases at the ranges where the diaphragm is fully open. As was indicated above it is impossible to eliminate this error in conventional cameras. However, with the present invention this error is very reliably eliminated in a manner described below, and the extent of the exposure is determined according to the invention in a fully accurate manner corresponding to the actual T number of the lens which is used.

Although the above relationship (3) is respresentative of that which should be satisfied by the electrical shutter-controlling structure according to the invention, it is easier to understand when this relationship is transformed to the following:

$$T_V = (B_V - A_V) + S_V \tag{4}$$

The first term on the right side of the above equation (4) depends only upon the characteristics of the particular lens which is used and corresponds to the intensity of illumination at the surface of the photosensitive element which is exposed to the light. Thus, referring to the drawing, it will be seen that the light B coming from the object which is to be photographed passes through the objective means L L, while a diaphragm means D is operatively connected with the objective means to determine the exposure aperture. Thus, the objective means will, as is well known, direct an image of the object to the film during exposure. A reflector means M, in the form of a conventional tiltable return mirror of a type well known in single-lens reflex cameras, has the rest position illustrated where it extends across the optical axis at an angle of 45°. Therefore, when the reflector means M is in the illustrated rest position thereof it will reflect light upwardly through the viewfinder components including the focusing screen PG, the condenser lens CL, and the pentaprism or pentagonal Dach prism PP. This latter prism serves to direct the light through an eye-piece IP onto the photosensitive means PD which forms the photometric element such as a suitable photoelectric or photoelectromotive element which has a very rapid responding speed.

In order to provide from the photosensitive means PD a current output which is in proportion to the incident light, the electrical circuit means illustrated in the drawing and operatively connected to the shutter for controlling the latter includes a transistor $Q_1$ which is coupled at a low impedance and the collector current thereof is converted into signal voltage which is log compressed by the diodes $Q_2$ and $Q_3$. With a lens which has a preset diaphragm means or an automatic diaphragm means, the focussing is carried out and then the stop value is set to the preselected setting. When the shutter-actuating button is pressed, a switch $SW_p$ of the electrocircuit means is closed and thus the electrical circuit means is rendered operative. Thus, this switch $SW_p$ forms an operating means, or at least part of an operating means, for rendering the electrical circuit means, which is operatively connected to the shutter in a manner described in greater detail below, operative when this switch is closed upon depression of the shutter-operating plunger of the camera.

As is schematically represented by the dot-dash line connection between the diaphragm means D and the switch $SW_p$, the operating means also functions to stop down the diaphragm to the preselected value upon depression of the shutter-release button. At this time the reflector means M remains in the illustrated rest position so that light from the objective which is to be photographed travels through the objective means and is modified according to the preselected aperture of the diaphragm means D before reaching the reflector means M which thus reflects this light to the photosensitive means PD on which the light impinges.

The instant when the return mirror or reflector means M is snapped up to its exposure position displaced above the optical axis for bringing about the photometric control with the objective already stopped down according to the invention occurs later than the instant of time when the diaphragm has been fully stopped down and the photosensitive means or photometric element PD attains a substantially constant value. For this purpose a suitable delay mechanism which may be mechanical may be utilized. As is schematically represented in the drawing, the dot-dash line connection between the switch $SW_p$ of the operating means and the reflector means M includes a delay mechanism.

Considering this manner of operation in connection with specific values encountered in practice, the stopping down of the diaphragm means D takes place within 20 to 40 ms (milliseconds), while the photometric system and a storage capacitor $C_M$ of the electrical circuit means have a response as the storage unit system requiring approximately 1 ms. These times occur in sequence. With a conventional curtain shutter mechanism as used in cameras of this type, the time which elapses from depression of the shutter-release button to the movement of the leading curtain across the frame which is to be exposed on in other words across the film gate of the camera body has been predetermined so as to be on the order of 25 ms or more, so that the stopping down of the diaphragm and the snapping up of the return mirror or reflector means M to its exposure position are completed when the shutter achieves its fully open position.

The output current from the photosensitive means PD, in the form of a suitable photocell for example, serves as the input for the transistor $Q_1$ and the collector current thereof is converted by the diodes $Q_2$ and $Q_3$ into the log compression value which is in turn, stored as the terminal voltage of the storage capacitor $C_M$ of the electrical circuit means. This circuit means includes a memory switch $SW_M$ which is moved from its closed to its open position upon or immediately before the initial snap of the return mirror M, and the information in accordance with the brightness or light intensity at the scene which is to be photographed is in a condition already stored into the storage capacitor $C_M$ immediately before the displacement or snapping of the reflector means M upwardly to the exposure position. Thus, the interconnection between the switch $SW_M$ and the mirror M is indicated by a dot-dash line in the drawing, according to which it will be seen that this switch $SW_M$ is displaced to its open position when the reflector means M is displaced from its rest to its exposure position.

The capacity of the storage capacitor $C_M$ itself is, therefore, selected so as to be as low as possible, so that in this way the time constant for charging may be as short as possible and the photometric storing system will have an exceedingly rapid response. This result is achieved effectively by using a high input impedance element such as a transistor $Q_4$ of the field effect type.

The introduction of the factor of film speed or A S A conversion is achieved by changing the emitter resistance of a buffer transistor $Q_5$. For this purpose a variable resistor $R_{ASA}$ of exponential function is used. Through this resistor the term $S_v$, which is the second term on the right side of the basic relationship (4) is inserted into the circuit.

Thus, the voltage output corresponding to $T_V$ is applied to the base of transistor $Q_6$ and a charging current $i$ for timing purposes is obtained as the collector current of this log expansion transistor $Q_6$.

A timing switch $SW_T$ is opened in synchronism with the initiation of the shutter opening, and the result is that the timing capacitor $C_T$ beings to be charged with the constant current $i$ and the base potential of the transistor $Q_7$ begins to drop linearly, bringing about operation of electromagnet $M_G$ to close the shutter after the automatically determined exposure time has elapsed as a result of the transfer or switching level of a switching circuit formed by the transistor $Q_7$ and a second transistor $Q_8$. In this way the exposure is completed. Thus, as is well known, after the leading curtain has moved to open the shutter and also open the switch $SW_T$, the trailing curtain is prevented from following the leading curtain for an interval corresponding to the exposure time, and the release of the trailing curtain to follow the leading curtain and close the shutter is brought about by control of the electromagnet $M_G$ in the manner set forth above.

Thus, through the switch $SW_T$ and the electromagnet $M_G$ the illustrated electrical circuit means is operatively connected with the shutter to control the exposure time, and the entire structure is rendered operative by the operating means, responding to depression of the shutter-tripping button, which includes the power switch $SW_p$, the latter not only rendering the electrical circuit means operative but serving to stop down the diaphragm mechanism means D, and thereafter bringing about through the delay mechanism the movement of the mirror to its exposure position, this latter operation taking place after the photosensitive means $P_D$ has introduced into the electrical circuit the factor of light intensity and diaphragm setting. Because this latter factor is introduced directly from the objective and the diaphragm itself, it is unnecessary to use in the circuit any variable resistors corresponding to the setting of the diaphragm, and thus any structure for achieving a differential action between such a variable resistor and that which introduces the factor of film speed is completely eliminated. Only the variable resistor $R_{ASA}$ which introduces the factor of film speed is included in the circuit, so that with the circuit of the invention only one variable resistor is required.

Thus, the use according to the present invention of a photoelectromotive element as the photosensitive means PD coupled to the electrical control circuit means brings about a number of advantages. Among these advantages are the fact that an extremely rapid response is achieved, as well as the fact that the variable resistor usually employed for converting the preselected stop value of the diaphragm into an electrical signal is eliminated, and the so-called stop value conversion is achieved with the invention on the basis of the T number itself of the interchangeable lens so that in this way with this invention, exposures of high precision are possible irrespective of the particular type of interchangeable lens which happens to be used. Thus, the invention eliminates mechanisms which have heretofore been required for controlling shutters electrically, in particular the mechanisms which serve to attempt to achieve as accurately as possible a correction of the difference between the F number and the T number in a range adjacent the fully open diaphragm depending upon the type of the particular lens, so that with the structure of the invention there is achieved not only an increase in precision but also a simplification of the entire mechanism.

It is apparent that the results of the invention are not influenced by use of a direct processing system instead of a log compression of the signal from the photosensitive element and the following elements, although a linear operation processing system has been described above.

What is claimed is:

1. In a single lens reflex camera, which does not require a variable resistor for introducing the factor of aperture size, objective means for directing to film in the camera an image of an object which is to be photographed, diaphragm means operatively connected with said objective means to be stopped down for determining the exposure aperture, reflector means having a rest position extending across the optical axis and being movable from said rest position to an exposure position spaced from the optical axis when an exposure is made, photosensitive means coacting with said reflector means when the latter is in said rest position thereof for receiving light therefrom, electrical circuit means operatively connected with said photosensitive means and a shutter of the camera for controlling the shutter to determine the exposure time, and operating means coacting with said diaphragm means, said reflector means, and said electrical circuit means when an exposure is to be made for rendering said electrical circuit means operative and for stopping said diaphragm means down to a predetermined extent for providing a predetermined exposure aperture, so that while said reflector means remains in said rest position thereof said photosensitive means receives light therefrom for introducing into said electrical circuit means the factors of the light intensity at the object which is to be photographed and the size of the exposure aperture, said operating means maintaining said reflector means in said rest position while said diaphragm means is stopped down to said predetermined extent for a length of time sufficient to introduce into said electrical circuit means the factor of the aperture size, and said operating means then coacting with said reflector means for displacing the latter to said exposure position for exposing film in the camera and said electrical circuit means responding to movement of said reflector means to said exposure position for determining the exposure time, said electrical circuit means including a storage capacitor electrically connected with said photosensitive means to be charged according to the light received by said photosensitive means from said reflector means, and a switch also forming part of said electrical circuit means and operatively connected with said storage capacitor means for terminating the charging thereof when said switch opens, and means operatively connected between the latter switch and said reflector means for opening said switch when said reflector means is displaced from said rest position thereof to said exposure position, said switch being the only switch electrically connected with said storage capacitor means so that except for said switch said storage capacitor means is permanently connected with said electrical circuit means.

2. The combination of claim 1 and wherein said electrical circuit means includes a high input impedance element operatively connected with said storage capacitor for maintaining the capacitance thereof at a relatively low value to achieve a short charging time constant for said storage capacitor with rapid response of said photosensitive means.

3. The combination of claim 2 and wherein said circuit means includes a variable resistor for introducing the factor of film speed.

4. The combination of claim 3 and wherein said variable resistor is the only variable resistor in said electrical circuit means.

5. The combination of claim 4 and wherein said variable resistor is permanently connected with said electrical circuit means at the side of said capacitor means opposite from said switch so that said switch has no influence on the connection of said variable resistor into or out of the circuit formed by said electrical circuit means.

* * * * *

UNITED STATES PATENT OFFICE
CERTIFICATE OF CORRECTION

PATENT NO. : 3,812,497
DATED : May 21, 1974
INVENTOR(S) : Tohru Nakajima and Masatoshi Marui It is certified that error appears in the above-identified patent and that said Letters Patent are hereby corrected as shown below:

In the heading, change the name of the assignee from "Asaki Kogaku Kogyo Kabushiki Kaisha" to --Asahi Kogaku Kogyo Kabushiki Kaisha--.

Signed and sealed this 24th day of June 1975.

(SEAL)
Attest:

RUTH C. MASON
Attesting Officer

C. MARSHALL DANN
Commissioner of Patents
and Trademarks